3,438,390
VALVE HOUSING
Arthur E. Brown, Corning, N.Y., assignor to Ingersoll-Rand Company, New York, N.Y., a corporation of New Jersey
Filed May 10, 1966, Ser. No. 548,904
Int. Cl. F16k *17/00, 21/04*
U.S. Cl. 137—512.1    5 Claims

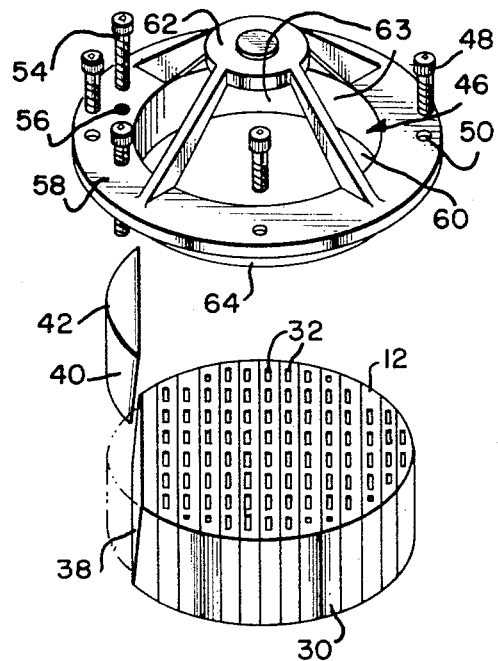
FIG. 2
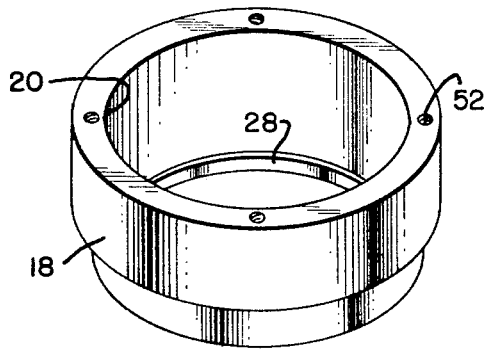
INVENTOR.
ARTHUR E. BROWN

United States Patent Office 3,438,390
Patented Apr. 15, 1969

ABSTRACT OF THE DISCLOSURE

A valve assembly formed from a plurality of flapper type valves, which is wedged in a housing by a wedging member and restrained from passing longitudinally from the housing by annular lips engaging the valve assembly at each of its ends.

---

Figure 1:
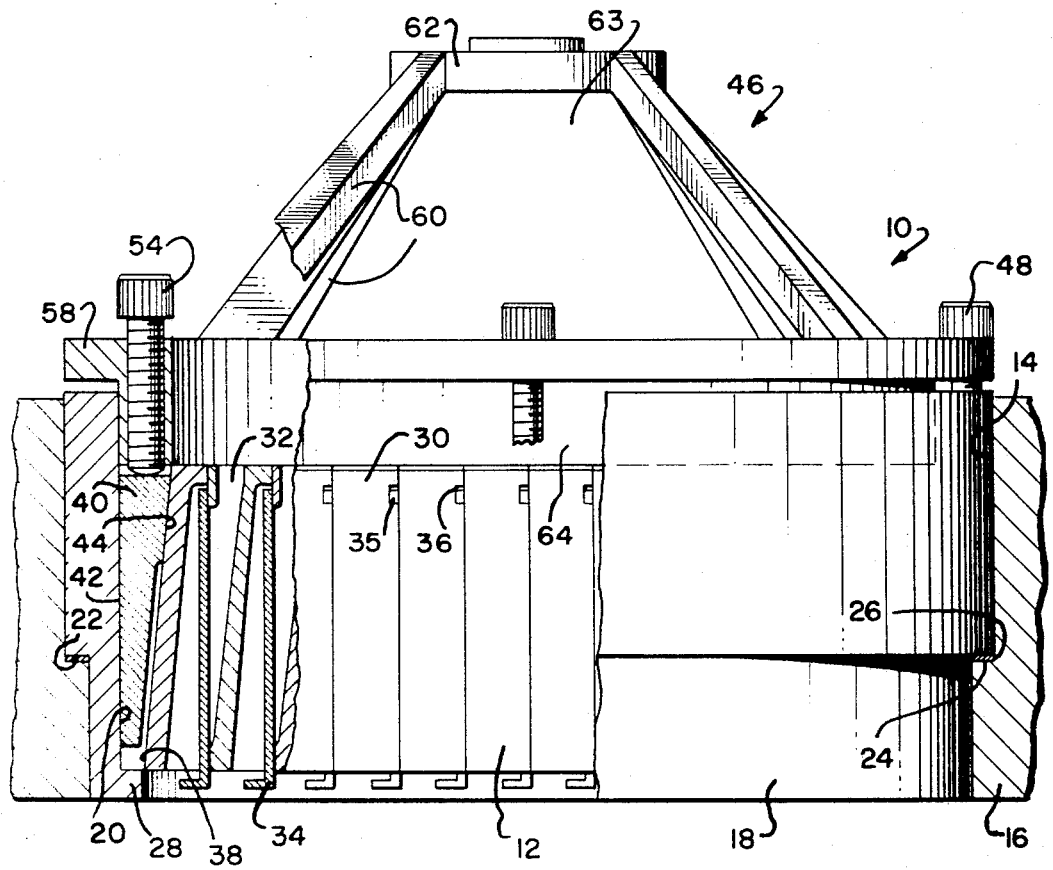

This invention relates to valves and has more particular reference to the provision of a new and improved housing which is particularly constructed and arranged for containing a valve assembly formed from a plurality of flapper type valves.

The combination of a plurality of flapper type valves in a valve assembly necessitates that the valve plates of the valve assembly be clamped in tight face-to-face relationship to prevent fluid leakage through the valve assembly. The successful operation of a valve assembly of this type requires that it be contained by a housing which is constructed to present only minimal interference to the fluid flow such that maximum fluid flow may pass through the valve assembly when the valves are in their fully open positions. The attainment of these diverse objectives has generally caused difficulties in the construction of housings for containing valve assemblies of this type inasmuch as such housings must be sufficiently thick to permit tight face-to-face clamping of the valve plates without undue housing distortion and must also be sufficiently thin to permit maximum fluid flow through the valve assembly when the valves are in their fully open positions.

The attainment of these diverse objectives has been especially difficult in the construction of housings for containing valve assemblies of this type which are employed in compressors. Compressor flow openings are generally constructed of circular cross section, thus requiring that the peripheries of the valve housings disposed therein be formed of circular configuration. The maintenance of these circular housing peripheries has compounded the beforesaid difficulties in that it has been found that the clamping of the valve plates in tight face-to-face relationship, prior to the insertion of the valve housings into the compressor, distorts the peripheries of the valve housings out of their circular configuration.

An object of the present invention is to provide a new and improved valve housing of the type set forth which is particularly constructed and arranged to permit maximum fluid flow through the contained valve assembly and to provide tight face-to-face clamping of the valve plates forming the contained valve assembly without substantial housing distortion.

Another object of the invention is to provide a new and improved valve housing of the type set forth which is particularly constructed and arranged to provide tight face-to-face clamping of the valve plates forming the contained valve assembly after the latter is inserted into the valve housing.

Another object is to provide a new and improved valve housing of the type set forth which is particularly constructed and arranged to be disposed within a compressor flow opening of circular cross section.

Another object is to provide a new and improved valve housing of the type set forth which is relatively simple and economical in construction and highly efficient in operation.

The foregoing objects, and the other objects and advantages of the invention which will be apparent from the following description taken in combination with the accompanying drawings, are obtained by the provision of a valve housing comprising wall means peripherally defining an opening for receiving a valve assembly, and wedge means insertable into the opening defined by the wall means for wedging the valve assembly tightly within such opening. Means are, preferably, provided adjacent the opposing ends of the valve assembly for supporting the valve assembly within the opening defined by the wall means, these means comprising, in the illustrated embodiment of the invention, a lip carried by the wall means within the opening and a lip carried by a cap member secured to the wall means. The wall means, and the lips on the cap member and the wall means, are, preferably, of annular configuration to facilitate the employment of the valve housing in a circular flow opening of a compressor.

FIG. 1 is an elevational view, partially broken away and in section, of a valve housing constructed in accordance with the present invention and containing a valve assembly formed by a plurality of flapper type valves; and FIG. 2 is an exploded view of the valve housing and contained valve assembly illustrated in FIG. 1.

Referring more particularly to the drawings wherein similar reference characters designate corresponding parts throughout the several views, FIG. 1, illustrates a valve housing designated generally as 10 which contains a valve assembly 12 and is disposed within a cylindrical, flow passage 14 of a compressor shown fragmentarily as 16. The valve housing 10 comprises an annular wall or body member 18, formed of relatively thin radial thickness, which circumferentially encloses a cylindrical space or chamber 20 within the flow passage 14. The external circumference of the annular wall member 18 is formed with a step 22 which cooperates with a corresponding step 24 formed on a wall defining the flow passage 14 to support the valve housing 10 transversely within the flow passage 14. An annular sealing member 26 is located between the cooperating steps 22 and 24 to prevent fluid flowing through the flow passage 14 from passing between the steps 22 and 24.

The annular wall member 18 is provided with an annular lip 28 which extends into the cylindrical space 20 from one end of the annular wall member 18. The annular lip 28 is constructed of sufficient width to securely support the valve assembly 12 within the valve housing 10, but is sufficiently narrow to provide no significant restriction of the fluid flowing through the valve assembly 12.

The valve assembly 12 is formed to include a plurality of stator or valve plates 30 which each include a plurality of aligned, flow openings or ducts 32 longitudinally therethrough for permitting fluid flow through the valve assembly 12. A flapper type valve element 34 is supported by each of the stator plates 30 within its respective flow ducts 32 for controlling the flow of fluid through such flow ducts 32. The valve elements 34 are each formed substantially the width of their respective stator plates 30 and include outwardly extending, flange portions 35 at their opposing lateral ends. The flange portions 35 of the valve elements 34 extend into slots 36 which are formed in the opposing sides of the stator plates 30 to secure each of the valve elements 34 to its respective stator plate 30. The flange portions 35 of the valve elements 34 and the slots 36 are relatively dimensioned to permit movement of the valve elements 34 between positions, as shown in FIG. 1, wherein they prevent fluid flow through the flow ducts 32 and positions, not shown, wherein they permit fluid flow through the flow ducts 32.

The stator plates 30, as illustrated in FIG. 2, are contoured to form the valve assembly 12 in the configuration of a segment of a cylinder having a radius substantially that of the cylindrical space 20. More specifically, each of the stator plates 30 is provided with arcuately contoured sides and is tailored in length such that its arcuate sides fit snugly within the cylindrical space 20. The lateral ends of the stator plates 30 are disposed upon the annular lip 28 such that the latter supports one end of the valve assembly 12. The stator plate 30 disposed at one end of the valve assembly 12, furthermore, is constructed of arcuate configuration such that it forms a snug fit with the annular wall member 18 along its entire side adjacent thereto. The stator plate 30 at the opposing end of the valve assembly 12 terminates in a sloped or angled side 38 such that the valve assembly 12 terminates at that end in an inclined chordal wall.

A tapered, wedge member 40 is provided for forming the valve assembly 12 into a substantially cylindrical configuration. The wedge member 40 includes an arcuate outer wall 42 adapted to engage the annular wall member 18 and a straight inner wall 44 adapted to contact the sloped or angled side 38. As illustrated in FIGS. 1 and 2, the wedge member 40 is of solid configuration; alternatively, however, the wedge member 40 could be formed as an additional stator plate 30. The wedge member 40 is longitudinally inserted into the cylindrical space 20 to wedge the stator plates 30 into tight face-to-face engagement with each other and, also, wedge the arcuate sides of the stator plates 30 into engagement with the annular wall member 18. Thus, the stator plates 30 may be locked in tight face-to-face engagement with each other after the insertion of the valve housing 10 into the flow passage 14; and the valve assembly 12 is in engagement along its entire outer circumference with the annular wall member 18.

A crab type, cap member 46 is secured to the end of the annular wall member 18 opposite to that carrying the annular lip 28 by a plurality of retaining bolts 48 which are threaded through aligned openings 50 and 52 in the cap member 46 and the annular wall member 18, respectively. A pair of adjusting bolts 54 are threaded through openings 56 formed in the cap member 46 in alignment with the wedge member 40. The adjusting bolts 54 engage the wedge member 40 such that tightening of the adjusting bolts 54 urges the wedge member 40 longitudinally into the cylindrical space 20 to cause the wedge member 40 to perform its beforedescribed wedging action. The location of the adjusting bolts 54 through the cap member 46 permits the tightening of the stator plates 30 to be accomplished after the wall member 18 is disposed within the flow passage 14. Thus, the walls of the flow passage 14 may be employed for ensuring that the annular wall member 18 does not distort during the tightening of the stator plates 30.

The cap member 46 comprises an annular flange 58 containing the beforedescribed openings 50 and 56, and a plurality of ribs 60 which extend inwardly from the annular flange 58 and terminate at a central hub 62. The openings 63 provided between the ribs 60 admit fluid to the valve assembly 12. The annular flange 58 carries a depending annular lip 64 which extends into the cylindrical space 20 adjacent the annular wall member 18 when the cap member 46 is fastened to the annular wall member 18 by the retaining bolts 48. The depending annular lip 64 engages the stator plates 30 and cooperates with the annular lip 28 to prevent the stator plates 30 from passing axially from the valve housing 10.

In the assembly of the beforedescribed apparatus, the annular wall member 18 is, preferably, first inserted into the flow passage 14 of the compressor 16 such that the walls of the flow passage 14 ensure that the annular wall member 18 is retained in its original annular configuration. The valve assembly 12 is then inserted into the cylindrical space 20 defined by the annular wall member 18 with the stator plates 30 arranged to form a segment of a cylinder, as shown in FIG. 2. The stator plates 30, thus inserted, are restrained from axially passing from the cylindrical space 20 by the annular lip 28. The wedge member 40 is inserted into the cylindrical space 20 to urge the stator plates 30 into face-to-face engagement; and the cap member 46 is located upon the wall member 18 and secured thereto by the retaining bolts 48. The tightening of the retaining bolts 48, in addition to securing the cap member 46 to the annular wall member 18, simultaneously clamps the stator plates 30 between the lips 28 and 64. The adjusting bolts 54 are inserted through the openings 56 with their ends in engagement with the wedge member 40 and are tightened to longitudinally move the wedge member 40 to tighten the face-to-face engagement of the stator plates 30. Thus, the stator plates 30 are clamped in tight face-to-face abutment by the wedge member 40 and are clamped against axial movement by the lips 28 and 64.

Although I have heretofore described only a single, preferred embodiment of my invention, it will be understood that this preferred embodiment of my invention has been described for the purposes of illustration only, and that my invention contemplates other embodiments and variations incorporating the basic invention disclosed in the before described preferred embodiment of my invention.

Having thus described my invention, I claim:

1. In combination, a wall peripherally defining a flow passage of circular cross section, a valve assembly including a plurality of valve plates provided with flow ducts and valving elements for controlling flow through said flow ducts, a housing comprising an annular housing body supported in said flow passage closely adjacent said wall and peripherally defining a housing opening of circular cross section, said valve assembly being contoured to have a cross section which is a segment of said housing opening and having an angled chordal wall, said valve assembly being disposed in said housing opening with said valve plates transversely across said housing opening and said valving elements controlling fluid flow therethrough, means restraining said valve assembly from passing longitudinally from said housing opening, and wedge means in said housing opening tightly wedging said valve assembly therein and having an arcuate wall engaging said housing body and a straight wall engaging said angled chordal wall of said valve assembly.

2. The combination of claim 1, further comprising actuating means for causing said wedge means to wedge said valve assembly.

3. The combination of claim 1, further comprising a skeletal cap member mounted to one end of said housing body, and said restraining means including lips on said housing body and said cap member cooperating to clamp said valve assembly therebetween.

4. The combination of claim 3, further comprising an actuating member threaded to said cap member and engaging said wedge means whereby axial movement of said actuating member causes said wedge means to wedge said valve assembly.

5. The combination of claim 1, further comprising said wall and said housing body including steps cooperating to detachably support said housing body in said flow passage.

(References on following page)

References Cited

UNITED STATES PATENTS

| | | | |
|---|---|---|---|
| 1,479,395 | 1/1924 | Metzgar | 137—454.4 |
| 2,417,270 | 3/1947 | Rutishauser | 137—512 |
| 1,463,658 | 7/1923 | Parker | 137—454.6 |
| 2,693,818 | 11/1954 | Tucker | 137—5121 XR |
| 2,756,017 | 7/1956 | Silverman | 251—367 XR |

FOREIGN PATENTS 527,385  3/1955  Italy.

WLLIIAM F. O'DEA, *Primary Examiner.*

WILLIAM H. WRIGHT, *Assistant Examiner.*

U.S. Cl. X.R.

137—454.2, 454.6; 251—362